United States Patent [19] [11] Patent Number: 5,039,635
Stempin et al. [45] Date of Patent: Aug. 13, 1991

[54] CARBON-COATED REINFORCING FIBERS AND COMPOSITE CERAMICS MADE THEREFROM

[75] Inventors: John L. Stempin, Beaver Dams; Dale R. Wexell, Corning, both of N.Y.

[73] Assignee: Corning Incorporated, Corning, N.Y.

[21] Appl. No.: 314,451

[22] Filed: Feb. 23, 1989

[51] Int. Cl.$^5$ .................. C04B 35/02; C03C 14/00
[52] U.S. Cl. ........................ 501/95; 501/32; 501/89; 427/220
[58] Field of Search ............ 501/95, 32, 89; 427/122, 220; 428/408, 367, 368

[56] References Cited

U.S. PATENT DOCUMENTS

| 3,790,393 | 2/1974 | Cowland et al. | 501/95 |
| 3,949,106 | 4/1976 | Araki et al. | 427/318 |
| 4,178,413 | 12/1979 | De Munda | 428/408 |
| 4,376,803 | 3/1983 | Katzman | 428/408 |
| 4,376,804 | 3/1983 | Katzman | 428/408 |
| 4,397,901 | 8/1983 | Warren | 428/101 |
| 4,464,475 | 8/1984 | Beall et al. | 501/9 |
| 4,589,900 | 5/1986 | Brennan et al. | 65/33 |
| 4,615,987 | 10/1986 | Chyung et al. | 501/8 |
| 4,626,515 | 12/1986 | Chyung et al. | 501/32 |
| 4,722,860 | 2/1988 | Doljack et al. | 428/260 |
| 4,735,850 | 4/1988 | Ehman | 501/95 |
| 4,748,079 | 5/1988 | Thebault | 428/408 |
| 4,752,503 | 6/1988 | Thebault | 427/248 |

Primary Examiner—William R. Dixon, Jr.
Assistant Examiner—Sue Hollenbeck
Attorney, Agent, or Firm—Kees van der Sterre

[57] ABSTRACT

Fiber-reinforced ceramic matrix composite products are made by providing inorganic fiber reinforcement materials with pyrolytic carbon coatings, combining the carbon-coated fibers with a selected ceramic matrix material to make a composite preform, and consolidating the preform with heat and pressure to form the fiber-reinforced composite. Preferably, the peak consolidation temperature of the composite is moderated, with the retained pyrolytic carbon coating acting to preserve tough fracture behavior in the composite product notwithstanding the absence of the conventional graphitic fiber interface layer therefrom.

7 Claims, No Drawings

CARBON-COATED REINFORCING FIBERS AND COMPOSITE CERAMICS MADE THEREFROM

BACKGROUND OF THE INVENTION

The present invention relates generally to fiber-reinforced composites wherein the matrix consists of a ceramic material. More particularly the invention relates to ceramic matrix composites comprising reinforcing inorganic fibers having a carbon coating disposed thereon.

Fiber-reinforced ceramic matrix composites comprising glass and/or glass-ceramic matrices are well known. U.S. Pat. No. 4,626,515 for example, discloses fiber-reinforced composites wherein the reinforcing fibers are composed of silicon carbide and the reinforced matrix is an essentially alkali-free, alkaline earth aluminosilicate glass. U.S. Pat. Nos. 4,615,987, 4,589,900 and 4,755,489 disclose silicon carbide fiber reinforced glass-ceramic composites wherein the matrix materials consist of an alkaline earth aluminosilicate glass-ceramic composition.

Proposed applications for ceramic matrix composites include components for heat engines. Such components must exhibit good strength and toughness at ambient and elevated temperatures in an oxidizing environment.

Composites reinforced with silicon carbide fibers such as Nicalon® fibers exhibit good strength and toughness, in part due to the presence of a graphitic layer at the fiber-matrix interface which controls fiber-matrix bonding and improves crack-resistant behavior. However, relatively high composite processing temperatures, typically above 1300° C., are presently needed to promote the development of this graphitic layer in the composite. This high temperature processing is expensive and can also harm other components of the composite.

Fiber coatings have been proposed as an alternative way to control fiber-matrix bonding. U.S. Pat. No. 4,397,901, for example, describes a composite article and method for making it wherein the fibers are provided with successive coatings of pyrolytic carbon, diffused silicon, and silicon carbide. U.S. Pat. No. 4,405,685 describes a similar coating system for carbon fibers wherein an inner coating consisting of a mixture of carbon and a selected metal carbide is used. U.S. Pat. Nos. 4,376,803 and 4,376,804 describe composite coatings consisting of amorphous carbon with overlayers of a metal oxide such as $SiO_2$ for reinforcing metal alloys.

Notwithstanding the development of these coatings, no effective functional replacement for the prior art graphitic interface has yet been discovered. Thus in silicon carbide fiber-reinforced ceramic matrix composites wherein this layer has not been adequately developed, brittle rather than tough failure modes are generally demonstrated.

Thus there remains a need for a simple coating system, and an economical method for applying it, which would protect inorganic fibers to be utilized for the reinforcement of ceramic matrix materials while preserving the desirable toughening and reinforcing characteristics of those fibers.

Particularly useful would be a functional replacement for the prior art graphitic interface which could be provided by a simple, low-temperature coating process. Such a process would reduce the potential for damaging the fibers at high temperatures.

Most preferably, chemical vapor deposition processing as used for fiber coating in the prior art would be avoided, as this is complex and expensive.

It is therefore a principal object of the present invention to provide a method for coating inorganic fibers which improves the utility of the fibers for ceramic matrix reinforcement.

It is a further object of the invention to provide coated silicon carbide fibers which can be used to manufacture fiber-reinforced ceramic matrix composites at relatively low and thus more economical temperatures.

Other objects and advantages of the invention will become apparent from the following description thereof.

SUMMARY OF THE INVENTION

The present invention provides a process for coating inorganic reinforcing fibers which is both inexpensive and effective in providing desirable fiber/matrix interface behavior. The coatings of the invention, which comprise pyrolytic carbon as the essential constituent, can be applied by solution coating processes, yet can provide a fully functional replacement for the graphitic carbon interfaces conventionally provided by high temperature consolidation or heat treatment in prior art silicon carbide-reinforced ceramic matrix composites.

In one aspect then, the invention includes a method for making a fiber-reinforced composite article wherein an inorganic fiber reinforcement material selected for incorporation into the article is first provided with a pyrolytic carbon surface coating. The resulting carbon-coated fiber reinforcement material is then combined with a selected ceramic matrix material, or precursor for the matrix material, in the conventional manner to provide a preform for the fiber-reinforced composite article.

The preform thus provided is thereafter consolidated with heat and pressure to produce a fiber-reinforced composite article wherein the carbon-coated fiber material, characterized by the presence of a pyrolytic carbon surface layer thereon, constitutes the reinforcing phase. Consolidation may be carried out at relatively low temperatures, i.e., temperatures typically not exceeding about 1300° C. Preferably, at least the initial phases of consolidation will be carried out in a non-oxidizing environment to avoid any damage to the fibers or to the carbon coating.

Pyrolytic carbon coatings may be applied to the inorganic reinforcing fibers by an economical solution coating method. The method comprises, first, applying to the surfaces of the fibers a liquid coating formulation comprising an organic compound which is convertible on heating to pyrolytic carbon. Thereafter, the fibers with the applied coating are heated, under non-oxidizing conditions as required, at a temperature and for a time sufficient to convert the organic compound to pyrolytic carbon.

One advantage of the pyrolytic carbon coating is to improve the pull-out characteristics of the fibers from the ceramic matrix material, particularly where consolidation of the composite is carried out at relatively low temperatures. Composites comprising glass-ceramic matrix materials and silicon carbide fibers which have not been provided with pyrolytic carbon coatings in accordance with the invention typically exhibit brittle failure with little fiber pull-out when consolidated at low temperatures.

In another aspect, the invention comprises a ceramic matrix composite article or product characterized by the presence of pyrolytic carbon-coated fibers therein. More generally, the fibers may comprise one or more surface coatings; however at least one of the coatings will consist essentially of pyrolytic carbon, such that the pyrolytic carbon can provide a functional interface between the reinforcing fibers and the ceramic matrix. Typically, the reinforcing fibers in the composite of the invention will be selected from the group consisting of silicon carbide fibers and oxide fibers, and the matrix of the composite will be selected from the group consisting of aluminosilicate glass-ceramics and aluminosilicate glasses.

In the preferred embodiment of the invention, the pyrolytic carbon layer on the fiber surface will constitute the principal functional interface in the composite system. Thus the surface coating or coatings on the reinforcing fibers will be substantially free of graphitic carbon.

DETAILED DESCRIPTION

While the invention has primary utility for the treatment of silicon carbide fibers, especially Nicalon® silicon carbide or oxycarbide fibers, the invention is not limited to such fibers, and other types of fibers, including both oxide and non-oxide fibers, may be usefully treated. In the latter case, both pure silicon carbide fibers produced by the vapor deposition of silicon carbide as well as silicon oxycarbide carbide fibers produced by the oxidation of polymer precursors, may be used. These fiber types will hereinafter simply be interchangeably referred to as silicon carbide fibers.

Oxide fibers which may be treated include, for example Nextel® ceramic fibers composed substantially of mullite. It is expected that pyrolytic carbon coatings will prove to be highly effective to protect oxide fibers from harmful interactions with glass and glass-ceramic matrix materials during composite consolidation.

Many different ceramic matrix materials are compatible with the carbon coatings of the invention, including most of the known alkaline earth aluminosilicate glasses and alkaline earth aluminosilicate glass-ceramics used in the prior art for ceramic matrix composites.

Examples of useful prior art matrix materials include glass-ceramics wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$) Disclosed in U.S. Pat. No. 4,615,987, these may consist essentially, in weight percent, of about 0-25% CaO, 0-30% SrO, 10-30% CaO+SrO, 0-15% MgO, 0-25% BaO, 0-4% Na$_2$O, 0-6% K$_2$O, 25-38% Al$_2$O$_3$, 35-60% SiO$_2$, 0-15% ZrO$_2$, 0-3% As$_2$O$_3$, 0-30% total of BaO+MgO+Na$_2$O+K$_2$O+TiO$_2$+ZrO$_2$+As$_2$O$_3$, and 0-10% total of nucleating agents selected in the indicated proportion from the group consisting of 0.1-3% Cr$_2$O$_3$, 0.25-3% HfO$_2$, 2-5% MoO$_3$, 0.25-3% Nb$_2$O$_5$, 0.25-3% Ta$_2$O$_5$, and 0.25-3% WO$_3$.

Another prior art matrix material is a glass-ceramic comprising a predominant crystal phase consisting essentially of triclinic anorthite in solid solution with at least one of mullite and alpha alumina. Disclosed in U.S. Pat. No. 4,755,489, these may consist essentially, in weight percent, of about 16-20% CaO, 38.5-46% Al$_2$O$_3$, 35-42% SiO$_2$, 0.25-1.5% As$_2$O$_3$, and up to 10% total of at least one nucleating agent selected in the indicated proportion from the group consisting of 0.1-3% Cr$_2$O$_3$, 0.25-3% HfO$_2$, 2-5% MoO$_3$, 0.25-3% Nb$_2$O$_5$, 0.25-3% Ta$_2$O$_5$, 0.25-3% WO$_3$, and 1-10% ZrO$_2$, the composition being substantially free of TiO$_2$ and containing Al$_2$O$_3$ in an amount which is at least 10 mole percent and up to 50 mole percent in excess of that present in stoichiometric triclinic anorthite.

Also known and useful, for example from U.S. Pat. No. 4,464,475, are glass-ceramics wherein the principal crystal phase is selected from the group consisting of barium osumilite, cordierite, and stuffed cordierite wherein a stuffing ion selected from the group of Ba, Sr, Ca and Cs is present. These may consist essentially, in weight percent, of about 35-60% SiO$_2$, 17-40% Al$_2$O$_3$, 5-15% MgO, 3-18% total of one or more oxides selected from the group consisting of BaO, CaO, SrO and Cs$_2$O, 0-5% Nb$_2$O$_5$, 0-10% Ta$_2$O$_5$, 0-6% ZrO$_2$, 0-1% Si, 0-3% As$_2$O$_3$ and 0-10% ZnO.

Particularly preferred are glass-ceramics of each of the above types wherein 0.1-5% of Nb$_2$O$_5$ and 0.5-3% As$_2$O$_3$ are present.

Aluminosilicate glasses useful as matrix materials in the fiber-reinforced composites of the invention are alkaline earth aluminosilicate glasses consisting essentially, in weight percent on the oxide basis, of about 50-66% SiO$_2$, 11-19% Al$_2$O$_3$, 20-30% total of RO, wherein RO consists of one or more oxides selected from the group consisting of CaO, MgO, SrO and BaO, 0-8% B$_2$O$_3$, and 0-2% of As$_2$O$_3$. Most preferably these are substantially free of alkali metal oxides such as Na$_2$O, Li$_2$O, and K$_2$O.

Table I below provides examples of compositions for glass and glass-ceramic matrix materials particularly suitable for use in accordance with the invention. Examples A, B and I of Table I represent glass compositions which are thermally crystallizable to barium-stuffed cordierite as the predominant crystal phase, while compositions C and D form barium osumilite and compositions E and F form anorthite as predominant crystal phases. Compositions G and H represent glasses which are thermally crystallizable to glass-ceramic materials wherein the predominant crystal phase is triclinic anorthite in solid solution with one or both of mullite and/or alumina. Composition J is an alkaline earth aluminosilicate composition useful for the manufacture of glass matrix composites. Compositions reported in Table I are given in parts by weight on the oxide basis.

TABLE I

|  | A | B | C | D | E |
|---|---|---|---|---|---|
| SiO$_2$ | 42.4 | 43.66 | 50.63 | 53.2 | 45.6 |
| Al$_2$O$_3$ | 36.0 | 37.11 | 27.66 | 25.0 | 36.2 |
| CaO | — | — | — | 14.1 | 8.1 |
| BaO | 6.0 | 6.20 | 13.27 | 12.5 | — |
| MgO | 12.6 | 13.03 | 3.44 | 8.4 | 4.4 |
| As$_2$O$_3$ | 0.68 | 0.70 | 1.0 | 1.0 | 0.5 |
| ZrO$_2$ | 3.0 | — | — | — | — |

|  | F | G | H | I | J |
|---|---|---|---|---|---|
| SiO$_2$ | 48.1 | 35.4 | 39.5 | 43.26 | 57.0 |
| Al$_2$O$_3$ | 35.6 | 45.0 | 38.5 | 36.73 | 16.0 |
| CaO | 16.5 | 19.0 | 18.4 | — | 10.0 |
| BaO | — | — | — | 6.11 | 6.0 |
| MgO | 8.3 | — | — | 12.81 | 7.0 |
| As$_2$O$_3$ | 0.5 | 0.05 | 0.48 | 0.67 | — |
| ZrO$_2$ | — | 3.0 | 3.0 | — | — |
| Nb$_2$O$_5$ | — | — | — | 1.0 | — |
| B$_2$O$_3$ | — | — | — | — | 4.0 |

The fundamental steps of applying carbon coatings in accordance with the invention comprise, first, applying a coating of a carbon source compound to the surface of the fibers, and thereafter thermally decomposing the coating of carbon source compound under reducing conditions (pyrolysis) to convert the source compound to a pyrolytic carbon coating.

A particularly convenient method for applying the carbon source compound coating to the fibers is to apply to the surfaces of the fibers a solution of the source compound. Conveniently, the fibers are simply dipped in such a solution and dried to remove volatile solution components from the coating.

A number of different types of hyrdocarbon compounds can be utilized to provide fiber coatings which can be effectively converted to pyrolytic carbon coatings on inorganic reinforcing fibers. The compounds may generally be described as non-volatile liquid or solid hydrocarbon compounds, capable of being liquid-applied either directly in the form of a solution as a continuous liquid coating on the surfaces of the selected reinforcing fibers.

Representative of the various types of hydrocarbon compounds are carbohydrates, including sugars such as sucrose, non-volatile or polymerizable hydroxy-functional hydrocarbons such as furfuryl alcohol, and hydrocarbon polymers such as polyvinyl butyral.

Pyrolysis of the fiber coating thus provided can be carried out in any suitable reducing environment. Most preferably this is accomplished by heating the coated fibers to a temperature in the range of about 600°–1000° C. in a reducing atmosphere such as a forming gas atmosphere. The optimum conditions for developing the pyrolytic coating will depend on the source compound employed, but may readily be determined for each compound by routine experiment.

Carbon-coated fibers produced as above described are most conveniently incorporated into glass and glass-ceramic matrix materials if the matrix materials are provided in particulate or powdered form. Such particulate matrix materials may readily be produced from glasses by converting the molten glass to a glass frit and then ball-milling or otherwise milling the glass frit to form a fine glass powder.

Glass powders produced in this manner can readily be applied to fibers by coating the fibers with liquid suspensions of the powders. Typically, the powders will be suspended in a suitable coating vehicle comprising dispersants and binder constituents, and then the suspensions thus provided will be applied to the carbon-coated fiber tows or mats by immersing them into the matrix suspension.

Conventionally, the vehicle will comprise binder constituents and the coated fibers or fiber tows will be laid up in close array to form a fiber-matrix preform or so-called prepreg. This prepreg is then dried and, preferably subjected to a burnout process involving heating to remove residual vehicle and binder constituents from the prepreg. In accordance with the invention, burnout is most preferably carried out in a non-oxidizing atmosphere such as nitrogen to protect the pyrolytic carbon coatings on the fibers from oxidation.

Consolidation of the carbon- and matrix-coated fiber prepreg into a dense integral composite can be accomplished by any of the known prior art consolidation techniques such as hot pressing or hot isostatic pressing. Where the ceramic matrix material consists of a glass precursor for a glass-ceramic matrix, crystallization is typically accomplished during the latter stages of the consolidation heat treatment.

Advantageously, consolidation may be carried out at temperatures not exceeding about 1300° C., and using parameters dictated solely by the characteristics of the glass and glass-ceramic matrix. Thus there is no requirement to develop a graphitic carbon interface or coating on the fibers at any stage of the process, and in fact the resulting composites may be substantially free of graphitic carbon, as an interface material or otherwise. Nevertheless, fracture toughness at least equivalent to that of silicon carbide reinforced composites processed at much higher temperatures may be attained.

The invention may be further understood by reference to the following illustrative examples.

EXAMPLE 1

Silicon carbide reinforcing fibers consisting of Nicalon ® NLM-202 fiber tows are selected for processing in accordance with the invention. Each tow is made up of approximately 500 SiC filaments of substantially cylindrical cross-section, the filaments having diameters of about 10–15 microns. These fibers include a polyvinyl acetate sizing material which is removed from the surfaces of the fibers by exposure to a gas-oxygen flame prior to the oxide coating step.

To provide the fibers with pyrolytic carbon coatings, precursor coatings of polymerized furfuryl alcohol are first applied to the tows. To apply these coatings, one of two coating processes is used. In the first process (A), a continuous tow of the fibers is transported at a pull rate of approximately 5 ft./min. through a liquid reservoir containing furfuryl alcohol. The fibers coated with the alcohol are then transported through a second liquid reservoir comprising an aqueous hydrochloric acid solution comprising 25% (weight) HCl which acts to polymerize the alcohol.

In the second coating process (B), a continuous tow of the fibers is transported at a pull rate of approximately 5 ft/min through a liquid reservoir containing pre-polymerized furfuryl alcohol. The furfuryl alcohol is pre-polymerized by mixing the alcohol with aqueous 25% (weight) HCl in a volume ratio of 20:1 alcohol to HCl solution prior to use.

After alcohol coating by the selected process, the fibers with polymerized alcohol thereon are next air-dried at approximately 200° C. and are then exposed to a pyrolyzing procedure. In this procedure the dried fibers are transported through a furnace operating at a temperature of about 700° C. and containing a flowing forming gas atmosphere consisting of 92% nitrogen and the remainder hydrogen by volume.

Following the coating pyrolysis step, the selected coating procedure (A) or (B) as above described is repeated, and the polymerized coating again pyrolyzed, in order to double the thickness of the carbon coating on the fibers.

The result of this coating process is a fiber material wherein the fibers comprise an adherent pyrolytic carbon surface film. Film thickness typically is in the range of 400–800 Å for the described double coating procedure.

A powdered glass matrix material suitable for use as a composite matrix is prepared for incorporation into the composite. The glass has a composition, in weight percent, of about 39.5% $SiO_2$, 38.5% $Al_2O_3$, 18.4% CaO, 0.5% $As_2O_3$, and 3.0% $ZrO_2$, a composition which can be converted to a highly crystalline anorthite glass-ceramic material through appropriate heat treatment. The glass is prepared by melting in a platinum crucible, with the resulting melt being converted to glass frit by drigaging. The glass frit is then milled to provide a glass powder with an average particle size of about 10 microns.

The glass powder thus provided is incorporated into a slurry suitable for application of the matrix powder to a fiber reinforcement. A slurry is prepared by first preparing a vehicle consisting, in parts by weight, of about 700 parts isopropyl alcohol, 70 parts water, 52.2 parts of a polyvinyl acetate binder, and 70 parts of Katapol ™ VP532 dispersant, this dispersant being commercially available from the GAF Corporation, Wayne, N.J. To this vehicle is added the glass matrix powder in a proportion of about 315 parts by weight to provide the final slurry.

To prepare prepreg sheets for composite manufacture from the carbon-coated fibers and slurry, the fibers are transported through the slurry and wound onto a drum to provide a fiber aligned sheet thereon. The sheet is then dried and cut from the drum to produce a flat sheet wherein the fibers are aligned parallel to each other.

To provide consolidated ceramic matrix composite articles from the prepreg sheet described, eight sheets are stacked in fiber parallel alignment to form prepreg stacks and the stacks are processed through a burn-out cycle comprising heating at ambient pressure to 450° C. in a nitrogen atmosphere for two hours. This permits removal of the binder constituents from the stacks without undesirably degrading the carbon film on the surfaces of the fibers.

Following the burn-out procedure, the prepregs are consolidated by heating, typically in a non-oxidizing atmosphere, to a selected peak temperature which may range up to about 1340° C. while at an applied pressure of approximately 1500 psi. This consolidation procedure, which typically comprises a hold of about ten minutes at the peak temperature and pressure, is sufficient to achieve full densification of the preform (e.g., a density of at least 95% of theoretical maximum composite density) without damage to the pyrolytic carbon coating. Consolidation also converts the glass matrix material to a glass-ceramic matrix wherein anorthite constitutes the principal crystal phase.

The consolidated fiber-reinforced glass-ceramic composites produced as described are then cut into sample bars for physical testing. Typically, these samples are tested in four-point flexure both at room temperature (25° C.) and at 1000° C. The results determine the effectiveness of the carbon-coated fiber-matrix system in retaining toughness at elevated temperatures.

Table II below reports typical results for composite samples produced as above described. In the Table, Sample 1 represents a control sample consisting of a composite of uncoated silicon carbide fibers processed to 1340° C. to produce a graphitic interlayer on the fibers. Samples 2-6 represent coated fiber composites wherein the fiber was treated with furfuryl alcohol and subsequently polymerized, while samples 7-9 represent coated fiber composites wherein the fibers were treated with pre-polymerized furfuryl alcohol.

Included in Table II for each of the samples tested are an indication of the peak consolidation temperature employed, the temperature at which each composite is tested for strength, the elongation of each sample at the microcrack point and the ultimate failure point, and the stresses at which microcracking and ultimate failure of the samples occurred. Also indicated for each test is the fracture morphology observed during testing, whether fibrous (indicating extensive fiber pull-out), woody (some fiber pull-out being evident), or brittle (single surface fracture with no indication of protruding fiber ends).

TABLE II

| Sample No. | Sample Consol. | Test Temp. (°C.) | εMCY (%) | σMCY Ksi | εULT (%) | σULT Ksi | Fracture Morphology |
|---|---|---|---|---|---|---|---|
| 1 | 1340° C. | 25 | .24 | 38.8 | .64 | 88.5 | F |
|   | 1500 psi | 1000 | .21 | 30.9 | .22 | 32.8 | B-W, F |
| 2 | 1340° C. | 25 | .26 | 43.4 | .70 | 88.5 | F |
|   | 1500 psi | 1000 | .22 | 33.9 | .24 | 32.8 | B-W |
| 3 | 1150° C. | 25 | .15 | 24.5 | .22 | 88.5 | F |
|   | 1500 psi | 1000 | .16 | 19.2 | .16 | 32.8 | B-W |
| 4 | 1250° C. | 25 | .18 | 28.8 | .36 | 52.9 | F |
|   | 1500 psi | 1000 | .18 | 26.2 | .18 | 26.2 | B-W |
| 5 | 1150° C. | 25 | .17 | 26.5 | .30 | 45.2 | W/F |
|   | 1500 psi | 1000 | .17 | 20.5 | .24 | 22.7 | B-W, F |
| 6 | 1250° C. | 25 | .25 | 40.2 | .52 | 52.9 | F |
|   | 1500 psi | 1000 | .21 | 26.6 | .21 | 26.2 | B-W, F |
| 7 | 1250° C. | 25 | .25 | 38.5 | .68 | 84.5 | F |
|   | 1500 psi | 1000 | .22 | 33.4 | .22 | 34.6 | B-W |
| 8 | 1200° C. | 25 | .24 | 40.6 | .74 | 89.4 | F |
|   | 1500 psi | 1000 | .18 | 32.1 | .30 | 32.1 | B-W, F |
| 9 | 1150° C. | 25 | .24 | 28.8 | .58 | 79.7 | F |
|   | 1500 psi | 1000 | .24 | 20.5 | .28 | 24.3 | B-W |
| 6 | 1250° C. | 25 | .25 | 40.2 | .52 | 52.9 | F |
|   | 1500 psi | 1000 | .21 | 26.6 | .21 | 26.2 | B-W, F |

Consistent with the data shown in Table II, it is usually found that composites comprising reinforcing fibers which incorporate pyrolytic carbon coatings exhibit room temperature properties which include good fiber pull-out behavior and fracture toughness even when consolidated at temperatures well below 1300° C. These consolidation conditions are generally not effective to develop a graphitic carbon interface on the surfaces of silicon carbide reinforcing fibers. Thus the requisite composite toughness is attained through the inclusion of the pyrolytic carbon interface only.

EXAMPLE 2

The procedure for making carbon-coated fibers for ceramic matrix reinforcement in accordance with Example 1 is followed, except that in place of the combined furfuryl alcohol/hydrochloric acid coating solutions a sucrose coating system is used. The sucrose medium consists of 0.41M aqueous sucrose solution comprising 17.5 grams of sucrose per 125 ml. of water.

Nicalon® NLM-202 fiber tows are transported through this sucrose solution at a rate of about 10 ft./min., and are then air dried at 350° C. Thereafter, the sugar-coated fibers are pyrolized by hearing 800° C. in a flowing forming gas atmosphere to produce fibers having a thin adherent coating of crystalline carbon. The coatings typically have a thickness of 200-500 Å.

The carbon-coated fibers thus provided are incorporated into a ceramic matrix material as described in Example 1, and are then consolidated with the matrix material onto dense fiber-reinforced glass-ceramic matrix composites at consolidation temperatures in the range of 1150°-1300° C. The resulting composites are then tested for physical properties.

The results of the physical testing of these composites are shown in Table III below. Included in Table III for each sample tested are a report of the consolidation conditions employed, the temperatures at which the samples are tested in four-point flexure to determine the microcrack and ultimate strengths thereof, and the fracture morphology observed upon ultimate failure of each of the composites.

Calif. This resin is dissolved in solvent in a proportion of 50 parts resin and 50 parts solvent by volume, the solvent being either acetone or ethylene glycol monomethyl ether.

After coating the fibers with the PVB solution, they are heated for curing at 260° C. and then the resulting cured resin coating is pyrolyzed by heating the coated fibers to a selected temperature of 800° C. or, preferably, 650° C. in a flowing forming gas atmosphere.

Finally, the coated fibers are combined with the glass matrix material and formed and consolidated as described in Example 1, with peak consolidation temperatures in the range of 1200°-1340° C. being employed. Consolidation pressures of 1500 or 3000 psi are employed, with best consolidation being achieved at 1200°-1250° C. at the higher consolidation pressure.

Table IV below sets forth the results obtained upon the physical testing of coated fiber composites produced utilizing the coated fibers following the above described composite layup and consolidation procedures.

TABLE IV

| Sample No. | Sample Consol. | Test Temp. (°C.) | $\epsilon$MCY (%) | $\sigma$MCY Ksi | $\epsilon$ULT (%) | $\sigma$ULT Ksi | Fracture Morphology |
|---|---|---|---|---|---|---|---|
| 11 | 1340° C. | 25 | .28 | 47.7 | .41 | 67.9 | F |
|    | 1500 psi | 1000 | .33 | 37.1 | .33 | 42.1 | B-W |
| 12 | 1200° C. | 25 | .16 | 30.9 | .55 | 92.3 | F |
|    | 1500 psi | 1000 | .32 | 50.4 | .35 | 55.1 | W, Slightly F |
| 13 | 1250° C. | 25 | .22 | 34.8 | .78 | 101.0 | F |
|    | 1500 psi | 1000 | .28 | 41.5 | .32 | 44.1 | B, W, Slightly F |
| 14 | 1250° C. | 25 | .22 | 36.8 | .68 | 95.6 | F |
|    | 3000 psi | 1000 | .29 | 43.2 | .41 | 56.1 | B, W, Slightly F |
| 15 | 1250° C. | 25 | .22 | 31.8 | .78 | 94.3 | F |
|    | 1500 psi | 1000 | .30 | 40.9 | .34 | 44.6 | B, W, Slightly F |
| 16 | 1250° C. | 25 | .22 | 35.0 | .64 | 80.9 | F |
|    | 1500 psi | 1000 | .30 | 41.9 | .43 | 56.9 | B, W, Slightly |

TABLE III

| Sample No. | Sample Consol. | Test Temp. (°C.) | $\epsilon$MCY (%) | $\sigma$MCY Ksi | $\epsilon$ULT (%) | $\sigma$ULT Ksi | Fracture Morphology |
|---|---|---|---|---|---|---|---|
| 7 | 1340° C. | 25 | .32 | 57.5 | .58 | 79.9 | F |
|   | 1500 psi | 1000 | .25 | 35.4 | .42 | 55.0 | B-W |
| 8 | 1200° C. | 25 | .27 | 51.8 | .65 | 108.7 | F |
|   | 1500 psi | 1000 | .27 | 39.4 | .43 | 51.7 | B-W |
| 9 | 1250° C. | 25 | .31 | 54.6 | .71 | 109.8 | F |
|   | 1500 psi | 1000 | .28 | 40.1 | .42 | 55.8 | W-B |
| 10 | 1150° C. | 25 | .25 | 38.4 | .54 | 83.2 | F |
|    | 1500 psi | 1000 | .31 | 29.2 | .40 | 47.1 | W-B |

In these composites, again, desirable fracture behavior and toughness are preserved even in the low-temperature-consolidated composites despite the fact that the functional fiber-matrix interface is believed to consist predominantly of pyrolytic rather than graphitic carbon. Further, the strength characteristics of these composites are at least equivalent to those of the composite consolidated at 1340° C.

EXAMPLE 3

The carbon coating and composite manufacturing processes of Example 2 are repeated, except that a solution of polyvinyl butyral (PVB) in acetone is utilized in place of the sucrose solution to provide a pyrolytic carbon coating on the fibers. The polyvinyl butyral resin employed is Tamol TM 73210 resin commercially available from Metoramic Systems, Inc. of Carlsbad, As is evident from a study of the data in Table IV, excellent fiber pull-out behavior is observed for all composites in room temperature testing; however the composites consolidated below 1300° C. exhibited evidence of fiber pull-out even at test temperatures of 1000° C., a feature not seen in the product consolidated at 1340° C.

These results suggest that there is an advantage to low temperature consolidation beyond that of lower consolidation cost, i.e., possible improvements in the fracture performance of the product. This example illustrates what is presently considered to be the best mode for achieving high levels of composite performance in accordance with the invention.

In the case of oxide reinforcing fibers, the application of pyrolytic carbon coatings follows the same processing as used to coat silicon carbide fibers in the above examples. While carbon-coated oxide fibers do not offer greatly improved physical properties, they do exhibit some evidence of fiber pull-out from the matrix at both 2520 C. and at 1000° C., a characteristic not normally observed in these systems. In general, pyrolytic carbon coatings on mullite oxide fibers are found to be more porous than on carbide fibers, perhaps due to the surface character of the oxide fibers, and it is to be anticipated that further improvements in fiber pull-out behavior and strength and toughness would result form the use of thicker, non-porous carbon layers.

It has been previously recognized in the art that the protective coating of, for example, silicon carbide fibers can be useful to protect the fibers from oxidative deterioration during high temperature use. Similarly, carbon-coated fibers utilized in accordance with the invention can be provided with additional coatings, disposed on top of the pyrolytic carbon layer, where extra protection of the fibers from high temperature oxidation is desired. Boron nitride is an example of protective coating material which can enhance fiber performance in certain composite ceramic systems.

Of course the foregoing examples are merely illustrative of procedures and materials presently preferred for use in accordance with the invention. Obviously, numerous modifications and variations in procedure and in the selection of materials may be resorted to by those skilled in the art within the scope of the appended claims.

We claim:

1. A method for making a fiber-reinforced ceramic matrix composite article which comprises the steps of:
    selecting an inorganic fiber reinforcement material;
    providing a pyrolytic carbon coating on the surfaces of the inorganic fiber reinforcement material to produce a carbon-coated fiber material;
    combining the carbon-coated fiber material with a selected powdered glass or glass-ceramic matrix material to provide a preform for the fiber-reinforced composite article; and
    consolidating the preform to form the fiber-reinforced composite under a combination of heat and pressure at a temperature not exceeding about 1300° C., the combination being effective to achieve full densification of the powdered glass or glass-ceramic but insufficient to destroy the pyrolytic carbon coating.

2. A method in accordance with claim 1 wherein the step of applying a pyrolytic carbon coating to the surfaces of the inorganic fiber reinforcement material comprises the steps of:
    applying to the surfaces of the fibers a liquid coating comprising an organic compound convertible on heating to pyrolytic carbon; and
    heating the fibers and organic compound under non-oxidizing conditions at a temperature and for a time sufficient to convert the organic compound to pyrolytic carbon.

3. A method for treating an inorganic fiber reinforcement material comprising silicon carbide fibers to improve the pull-out characteristics thereof from a ceramic matrix material which comprises the steps of:
    applying to the surfaces of the fibers a liquid coating comprising an organic compound convertible on heating to pyrolytic carbon; and
    heating the fibers and organic compound under non-oxidizing conditions and at a temperature and for a time sufficient to convert the organic compound to pyrolytic carbon.

4. In the method for making a ceramic matrix composite article wherein an inorganic fiber reinforcement material is combined with a ceramic matrix material or a precursor therefor and the combination of fiber reinforcement material and matrix material is consolidated with heat and pressure to provide a fiber-reinforced ceramic matrix composite, the improvement characterized in that:
    prior to combining the inorganic fiber reinforcement material with the ceramic matrix material or a precursor therefor the fiber reinforcement material is provided with a pyrolytic carbon coating; and
    the combination of fiber reinforcement material and matrix material is consolidated at a temperature not exceeding 1300° C.

5. A ceramic matrix composite article comprising a matrix selected from the group consisting of aluminosilicate glass-ceramics and aluminosilicate glasses and reinforcing fibers selected from the group consisting of silicon carbide fibers and oxide fibers, wherein the reinforcing fibers comprise a surface coating and wherein the surface coating comprises a pyrolytic carbon layer.

6. A ceramic matrix composite article in accordance with claim 5 wherein the fibers are silicon carbide fibers, and wherein the surface coating is substantially free of graphitic carbon.

7. A ceramic matrix composite article in accordance with claim 5 wherein the surface coating consists essentially of pyrolytic carbon.

* * * * *